United States Patent [19]

Emmert

[11] Patent Number: 4,738,574
[45] Date of Patent: Apr. 19, 1988

[54] ROUTER JIG APPARATUS

[76] Inventor: Robert Emmert, R.R. #6, Mullendore Ranch, Glendive, Mont. 59330

[21] Appl. No.: 890,713

[22] Filed: Jul. 30, 1986

[51] Int. Cl.⁴ .................. B27C 5/00; B27F 1/08
[52] U.S. Cl. .................. 409/165; 144/134 D; 144/200; 269/57
[58] Field of Search .......... 144/134 A, 134 D, 198 R, 144/200, 205, 136 C, 137, 139, 145 R, 145 A, 154; 269/56, 57, 58, 71, 73; 409/165, 168, 224–226; 33/26, 27.01, 27.07, 27.11

[56] References Cited

U.S. PATENT DOCUMENTS

| 2,799,305 | 7/1957 | Groehn | 144/134 A X |
| 3,604,484 | 9/1971 | Viljoen | 144/198 R X |
| 4,273,483 | 6/1981 | Mendicino | 144/136 C X |
| 4,281,694 | 8/1981 | Gorman | 33/26 X |
| 4,299,263 | 11/1981 | Skinner | 144/134 D X |
| 4,305,439 | 12/1981 | Skinner | 409/224 X |
| 4,327,786 | 5/1982 | Markkula | 269/56 X |

Primary Examiner—Gil Weidenfeld
Assistant Examiner—Steven C. Bishop
Attorney, Agent, or Firm—Arthur L. Urban

[57] ABSTRACT

Router jig apparatus includes a base portion, a router positioning portion, a workpiece orbiting portion and a workpiece positioning portion. The base portion includes a quadrangular frame section disposed generally horizontally and a supporting stand extending downwardly from the frame section. The router positioning portion includes a plate section slidably engageable with the frame section, the plate section includes a central first opening of a shape to pass a motor of an inverted router and retain a work surface surrounding a bit thereof. The workpiece orbiting portion includes a guide section disposed above and closely adjacent to the frame section, the guide section including a large circular second opening therein. A disc member is rotatably positioned within the guide section opening, generally in a common plane therewith, the disc member including a central third opening. The workpiece positioning portion includes a support section resting on the disc member and a horizontally pivotable section carried by the support section. An upstanding specimen holding section has its lower end affixed to the pivotable section on a free side thereof and extends upwardly therefrom with securing mechanism for fixing the inclination of the upstanding section and specimen retaining mechanism disposed along the length of the upstanding holding section.

17 Claims, 1 Drawing Sheet

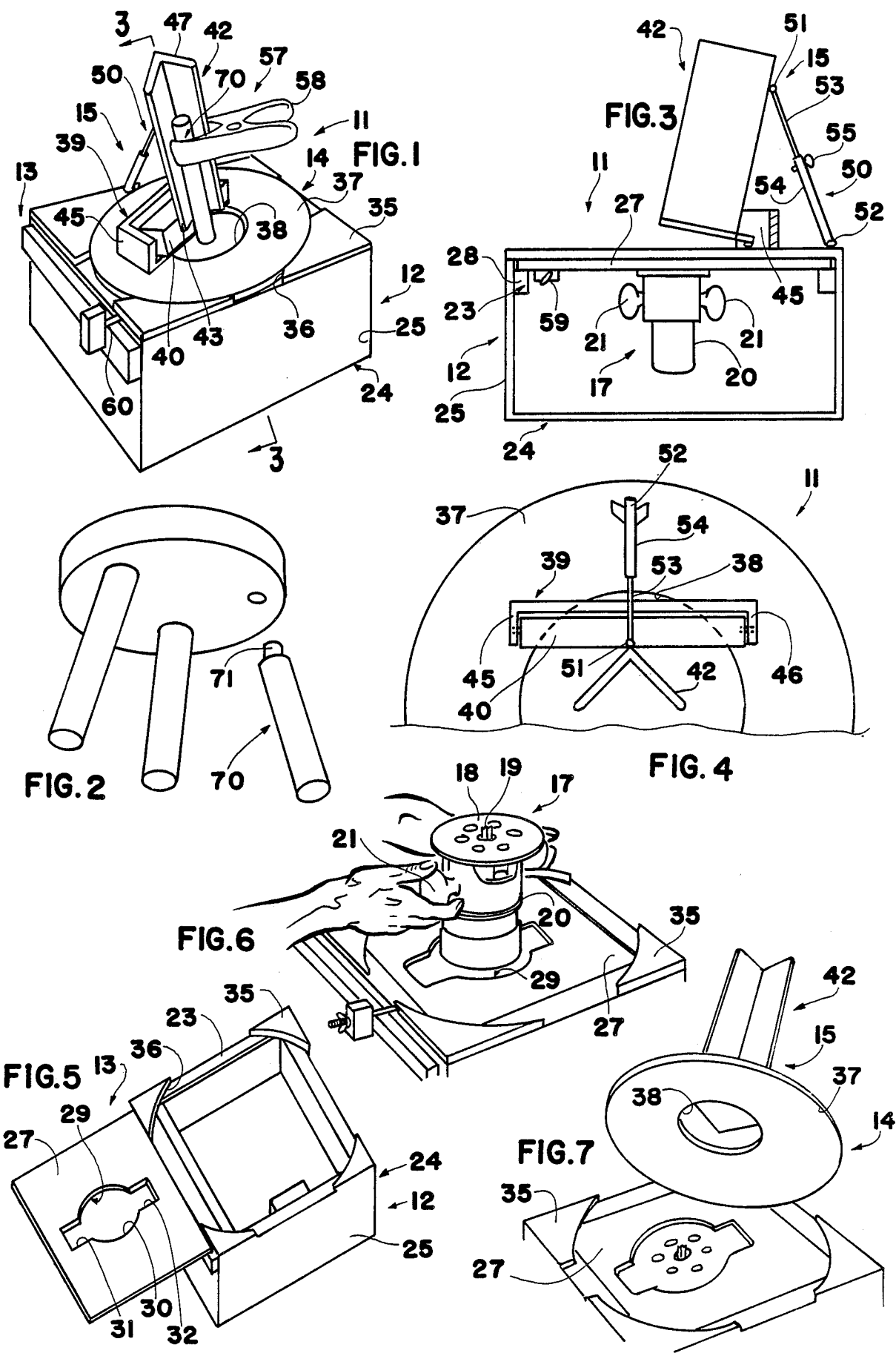

ROUTER JIG APPARATUS

This invention relates to a novel jig apparatus and more particularly relates to a new jig apparatus for use with a router.

In primitive societies, most tasks were performed by hand. Simple tools were all that were available so people had to rely on their strength either individually or in groups. Hammers, axes and similar tools were utilized to assemble or divide components and the like.

As civilization evolved, specialization came into existence. Individuals developed skills or talents that enabled them to earn a living doing particular tasks. Some persons prepared building materials, others constructed buildings, still others produced furnishings such as furniture for the buildings. These experts contined to employ hand tools but they were modified for the specific task that the individual performed as his primary work.

With the development of combustion engines and electrical motors, many hand tools were redesigned to accommodate the motors. Initially, these power sources were large and cumbersome, so they generally were employed with tools that could be used at a permanent location.

In the same way, furniture making changed to assembly lines in which the various components are mass produced on automatic or semi-automatic machines. However, through the years amateurs and a few craftsmen have continued to make furniture by hand. This trend has been fostered by the availability of small power tools with prices within the budgets of such individuals.

While power tools can be of some assistance in the making of furniture, the basic tools such as drills, saws, routers and the like are of little help in the fabrication of specialized components with unusual shapes. An example of such components are the legs of pieces such as tables, chairs, stools and the like. These legs commonly are fitted into the table tops or seats by the insertion of tenons formed at the upper ends of the legs into openings cut into the underside of the tops or seats.

To provide stability for the table and chairs, the legs are angled to increase the distance between the lower ends of the legs at the points of contact with the floor on which the piece rests. With this construction, the tenons usually are inserted into the top or seat at an angle to the leg itself.

Although tenons can be cut at the ends of legs automatically by special machinery at a furniture factory, for the individual cabinet maker, cutting tenons can be a time-consuming task that requires a high degree of skill and careful attention. Further, since legs ordinarily are angled differently at particular points on a piece of furniture, the tenon of each leg must be at the correct angle to insure that the table or chair is oriented properly when the legs rest on the floor so a symmetrical appearance will be achieved.

In the past, cutting tenons has been such a difficult task that many amateur cabinet makers switch to other constructions and thereby avoid the problems which would be encountered with tenon cutting. If such a change is not possible, a woodworker simply has to face the task with trepidation and muddle through the cutting as best he can with the tools available and accept the results even through they are less than optimum.

From the above discussion, it is clear that present and past methods and tools for cutting tenons in legs available to home cabinet makers have not provided satisfactory in many circumstances. Thus, there is a need for a new apparatus that overcomes the shortcomings of earlier devices and methods.

The present invention provides a novel router jig apparatus that eliminates the deficiencies of earlier devices and procedures and in addition provides features and advantages not found in previous devices. The jig apparatus of the invention enables a person to cut tenons on the legs with a conventional portable router. With the jig apparatus, tenons can be cut at preselected angles and sizes easily and quickly, from rough or finished stock.

The router jig apparatus of the present invention is simple in design and relatively inexpensive. The jig apparatus can be constructed from commercially available materials and components. Conventional assembly and fabrication methods and procedures can be utilized by semi-skilled labor to manufacture the jig apparatus.

The apparatus is durable in construction and has a long useful life. Little, if any, maintenance is required to keep the jig apparatus in good operating condition.

The jig apparatus of the invention can be used safely and efficiently by persons with limited aptitude and experience after a minimum of instruction. The apparatus can be set up to cut tenons with a wide variety of angles and sizes simply and conveniently. The setup can be changed easily and quickly for different tenons. Identical tenons can be reproduced easily once the setup has been made. The router can be mounted in the apparatus and removed for other tasks quickly and without difficulty.

These and other benefits and advantages of the novel router jig apparatus of the present invention will be apparent from the following description and the accompanying drawings in which:

FIG. 1 is a view in perspective of one form of router jig apparatus of the invention;

FIG. 2 is a view in perspective of a stool utilizing legs with tenons formed with the router jig apparatus shown in FIG. 1;

FIG. 3 is a side view in section of the router jig apparatus taken along line 3—3 of FIG. 1;

FIG. 4 is a fragmentary top view of the router jig apparatus shown in FIG. 1;

FIG. 5 is a view in perspective of the assembly of the router positioning portion with the base portion of the router jig apparatus shown;

FIG. 6 is a view in perspective of the assembly of a router with the router positioning portion of the router jig apparatus shown; and FIG. 7 is a fragmentary view in perspective showing the assembly of the workpiece orbiting and positioning portions with the router positioning and base portions of the router jig apparatus of the invention.

As shown in the drawings, one form of the novel router jig apparatus 11 of the present invention includes a base portion 12, a router positioning portion 13, a workpiece orbiting portion 14 and a workpiece positioning portion 15. The router 17 employed with the jig apparatus 11 of the invention is a commercially available portable power tool that includes a work surface 18, a cutting bit 19, a motor 20 and handles 21.

The base portion 12 of the router jig apparatus 11 of the invention includes a quadrangular frame section 23. The frame section 23 is disposed generally horizontally. This is accomplished with a supporting stand 24 that extends downwardly from the frame section 23. Advantageously, the supporting stand 24 includes an open box section 25.

The router positioning portion 13 of the jig apparatus 11 includes a plate section 27. The plate section 27 is sliadably engageable with the frame section 23 of the base portion. The frame section 23 preferably includes guide means 28 for the slidable plate section 27.

The plate section 27 of the router positioning portion 13 includes a central first opening 29. The central first opening is of a shape to pass motor 20 of an inverted router 17, that is, with the motor positioned at the lower end thereof. However, the size of the opening 29 is such that the work surface 18 of the router is retained at the surface of the plate section. To accommodate a router with handles 21, the central opening advantageously includes an enlarged center section 30 and smaller side sections 31 and 32 that may extend in opposite directions therefrom as shown.

The workpiece orbiting portion 14 of the router jig apparatus 11 of the invention includes a guide section 35. The guide section is disposed above and closely adjacent to the frame section 23. The guide section 35 includes a large circular second opening 36 therein.

A disc member 37 is rotatably positioned within the guide section opening 36. The disc member 37 is disposed generally in a common plane with the guide section opening. The disc member includes a central third opening 38. The disc member 37 advantageously has a diameter slightly less than the width of frame section 23. Preferably, the third opening 38 of the disc member has a size at least about that of the router work surface 18, and as large as is practical.

The workpiece positioning portion 15 of the jig apparatus 11 includes a support section 39 that rests on the disc member 37. A horizontally pivotable section 40 is carried by the support section 39. An upstanding specimen holding section 42 has its lower end 43 affixed to the pivotable section 40 on the free open side thereof. The holding section 42 extends upwardly from the pivotable section 40.

The support section 39 advantageously includes perpendicular end sections 45 and 46. The horizontally pivotable section 40 advantageously is carried between the perpendicular end sections 45 and 46. The upstanding specimen holding section 42 preferably includes a channel section 47. Most preferably, the channel section is a V-shaped trough section.

Securing means are included for fixing the inclination of the upstanding section 42. Such means preferably includes an adjustable length arm member 50 having an upper end 51 that is pivotally connected to the upstanding specimen holding section 42 at a point therealong remote from the horizontally pivotable section 40. The lower end 52 of the arm member has a lower end in pivotable contact with the disc member 37 at a point thereon adjacent the periphery thereof. Advantageously, the arm member 50 includes telescoping sections 53 and 54 and preferably includes position locking means such as thumb screw 55.

The workpiece positioning portion 15 further includes specimen retaining means 57 shown as clamp 58. The clamp may be separable from or affixed to the upstanding specimen holding section 42.

The jig apparatus 11 of the invention also may include adjustable screw means 59 for fine tuning the position of the plate section 27 with respect to the frame section 23. Preferably, calibrating means 60 may be included with the screw 59.

In the use of the router jig apparatus 11 of the present invention, the apparatus first is assembled. This may be accomplished by positioning base portion 12 on a suitable surface such as a workbench, table or the like. Next, the plate section 27 is inserted into frame section 23 disposed along the top of the base portion.

A router 17 is inverted so the cutting bit 19 extends upwardly. In this inverted position, the router is lowered into central first opening 29 of the plate section 27. Handles 21 of the router are aligned with side sections 31 and 32 of the central opening to facilitate lowering of the router through the opening 29. The router is lowered into the base portion until the circular work surface 18 of the router rests on the periphery of the center section 30 of the opening. Electrical power is supplied to the router conventionally by connecting it to a power supply such as with a power cord (not shown).

The circular guide section 35 of the workpiece orbiting portion 14 is mounted over the frame section 23 with suitable fasteners. Then, the disc member 37 is positioned within opening 36 of the guide section 35.

Thereafter, the workpiece positioning portion 15 is assembled. Horizontally pivotable section 40 is mounted in support section 39 and the lower end 43 of upstanding specimen holding section 42 is affixed to the pivotable section 40.

This workpiece positioning assembly is placed on the disc member 37 with the lower surface of the support section 39 resting on the disc member adjacent to third opening 38 therein and the channel section 47 facing the cutting bit 19 of the router 17. The length of the arm member 50 is adjusted so the lower end 52 thereof contacts the disc member 37 at a point thereon adjacent the periphery thereof to provide correct angulation of the channel section 47 with respect to the vertically oriented cutter 19. Elongated specimen 70 in which a tenon 71 is to be cut then is clamped to the channel section with a clamp 58. Instead of being angled, the channel section can be vertical to cut straight tenons, if desired.

To cut a tenon of the desired configuration at the end of the elongated specimen 70, power is supplied to the router 17 and the router bit 19 is moved into contact with the end of the specimen. This is achieved by sliding plate section 37 which carries the router toward the specimen end so the router bit engages it to the desired extent. Disc member 37 then is rotated at least one revolution so the bit cuts the tenon configuration desired, and the bit is no longer active.

When the cutting is completed, power to the router is interrupted, the clamp 58 released and the stock removed from the channel section 47. A tenon 71 such as shown in FIG. 2 has been cut in the end of the stock 70.

If identical tenons are to be cut in other legs, successive pieces of stock are clamped sequentially into the channel section 47 without disturbing the position of any of the components. Power is supplied to the router 17 again and the disc member 37 rotated a complete revolution for each tenon. Should it be desired to cut a tenon of a different size or angle, this can be accomplished easily and quickly by adjusting the angle of the channel section 47 and its position with respect to the router bit 19 as described above. The desired tenons are cut as easily as the first.

To use the router 17 for a task other than cutting tenons, the router can be removed from the jig apparatus 11 simply by lifting the disc member 37 with the channel section thereon from the base portion 12. This exposes the router so it can be lifted through the opening 29 and separated completely from the jig apparatus.

The router jig apparatus of the present invention may be fabricated from any of a wide variety of materials including wood, metal, plastic, combinations thereof and the like. The use of such easily workable materials facilitates the fabrication of alternative components to permit the cutting of different configuration tenons on other pieces of stock.

The above description and the accompanying drawings show that the present invention provides a novel router jig apparatus which overcomes the shortcomings of earlier devices and methods and in addition provides features and advantages not found in previous products and procedures. The jig apparatus of the invention enables a person to cut tenons on chair and table legs with a conventional inexpensive portable router.

The router jig apparatus of the present invention is simple in design and can be fabricated inexpensively using commercially available materials and components and employing conventional industrial procedures. The apparatus is durable in construction and has a long useful life with little maintenance.

The jig apparatus enables a person to cut tenons of desired angles and sizes simply and quickly. Also, the setup can be changed easily. The apparatus can be used safely and efficiently even by individuals with limited aptitude and experience after a minimum of instruction. Identical tenons can be reproduced rapidly. Also, the router can be mounted and removed quickly for other uses.

It will be apparent that various modifications can be made in the particular jig apparatus described in detail above and shown in the drawings within the scope of the present invention. The size, configuration and arrangement of components can be changed to meet specific requirements. The adjustable length arm member can be replaced with other securing means. Also, the base portion can be of a different design. Other power tools that utilize a cutting bit similar to that of a router can be substituted therefore. These and other changes can be made in the jig apparatus provided the functioning and operation thereof are not adversely affected. Therefore, the scope of the present invention is to be limited only by the following claims.

What is claimed is:

1. Router jig apparatus including a base portion, a router positioning portion, a workpiece orbiting portion and a workpiece positioning portion; said base portion including a quadrangular frame section disposed generally horizontally, a supporting stand extending downwardly from said frame section; said router positioning portion including a plate section slidably engageable with said frame section, said plate section including a central first opening, said central first opening being of a shape to pass a motor of an inverted router and retain a work surface surrounding a bit thereof; said workpiece orbiting portion including a guide section disposed above and closely adjacent to said frame section, said guide section including a large circular second opening therein, a disc member rotatably positioned within said guide section opening and generally in a common plane therewith, said disc member including a central third opening; said workpiece positioning portion including a support section resting on said disc member, a horizontally pivotable section carried by said support section, an upstanding elongated specimen holding section having its lower end affixed to said pivotable section on a free side thereof and extending upwardly therefrom, said upstanding holding section including a channel section, securing means for fixing the inclination of said upstanding section, specimen retaining means along the length of said upstanding holding section; whereby elongated stock is positioned in said upstanding holding section, the inclination thereof selected and the position of said lower end of said specimen is adjusted with respect to an upstanding bit of said router by sliding said plate section relative to said frame section so a tenon at the end of said specimen can be cut by rotating said disc member.

2. Router jig apparatus according to claim 1 wherein said supporting stand includes an open ended box section.

3. Router jig apparatus according to claim 1 wherein said frame section includes guide means for said slidable plate section.

4. Router jig apparatus according to claim 1 wherein said central opening of said plate section includes an enlarged center section and smaller side sections extending in opposite directions therefrom.

5. Router jig apparatus according to claim 1 wherein said plate section has a length providing a projection extending beyond said frame section.

6. Router jig apparatus according to claim 1 wherein said disc member has a diameter slightly less than the width of said frame section.

7. Router jig apparatus according to claim 1 wherein said central third opening of said disc member has a size approximately that of said router work surface.

8. Router jig apparatus according to claim 1 wherein said support section of said workpiece positioning portion includes perpendicular end sections.

9. Router jig apparatus according to claim 8 wherein said horizontally pivotable section is carried between said perpendicular end sections.

10. Router jig apparatus according to claim 1 wherein said channel section is a V-shaped trough section.

11. Router jig apparatus according to claim 1 wherein said securing means of said workpiece positioning portion includes an adjustable length arm member having an upper end pivotally connected to said upstanding specimen holding section at a point therealong remote from said horizontally pivotable section and having a lower end in pivotable contact with said disc member at a point thereon adjacent the periphery thereof.

12. Router jig apparatus according to claim 1 wherein said arm member includes telescoping sections.

13. Router jig apparatus including to claim 11 wherein said arm member includes position locking means.

14. Router jig apparatus according to claim 13 wherein said locking means includes a thumb screw.

15. Router jig apparatus according to claim 1 wherein said specimen retaining means includes clamp means.

16. Router jig apparatus according to claim 1 including adjustable screw means for fine tuning the position of said plate section with respect to said frame section.

17. Router jig apparatus according to claim 15 including calibrating means.

* * * * *